April 7, 1931.    L. C. BYARS    1,799,727
VALVE FOR TIRE INFLATERS
Filed June 9, 1926
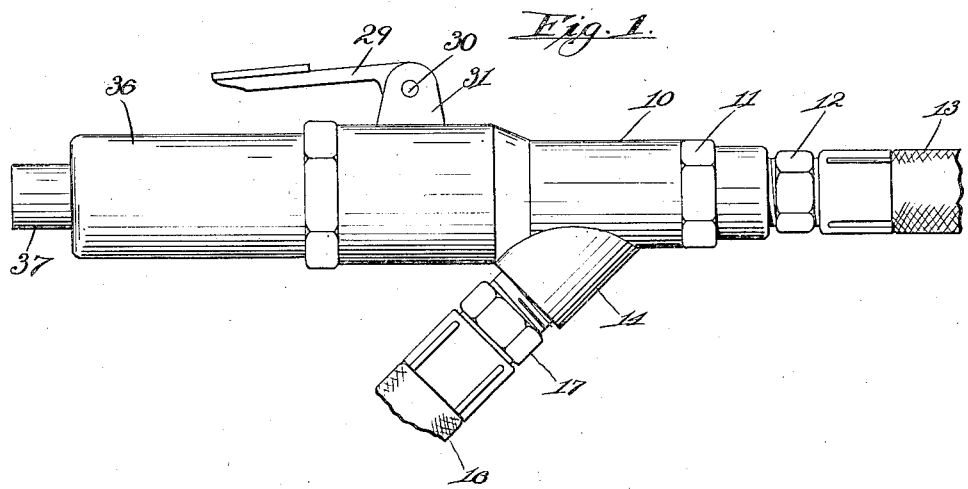
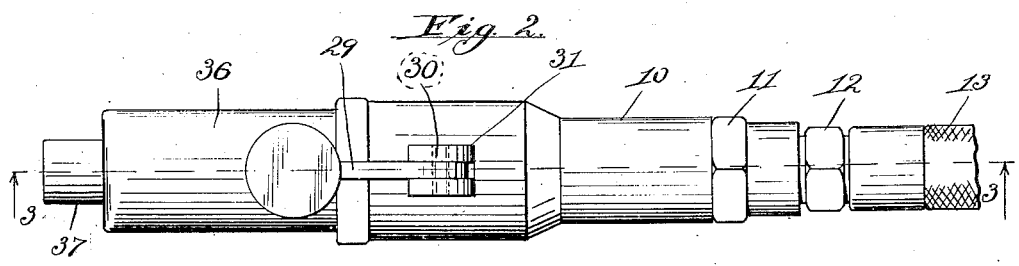
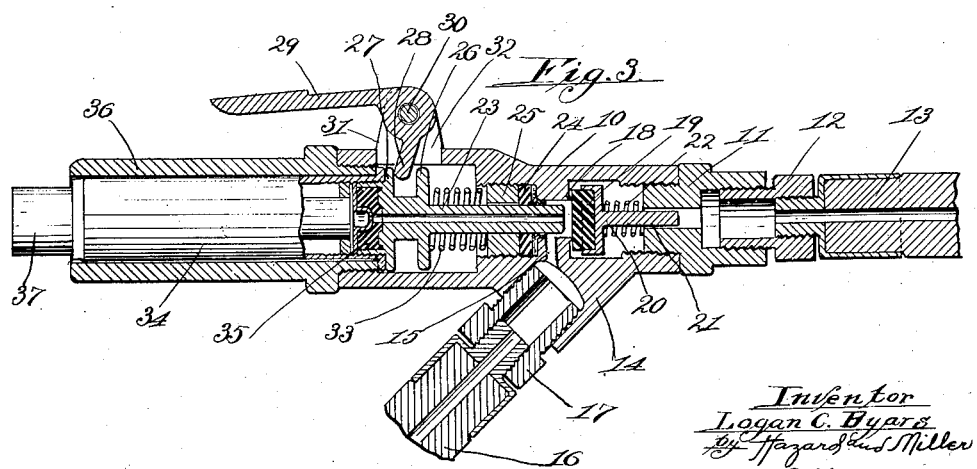
Inventor
Logan C. Byars
by Hazard and Miller
Attorneys Patented Apr. 7, 1931

1,799,727

UNITED STATES PATENT OFFICE

LOGAN C. BYARS, OF HUNTINGTON PARK, CALIFORNIA

VALVE FOR TIRE INFLATERS

Application filed June 9, 1926. Serial No. 114,632.

This invention relates to improvements in tire inflaters or combined valves and pressure gauges used in inflating automobile tires.

An object of this invention is to provide an improved tire inflater of cheap, simple and durable construction having a relatively few number of parts which are not apt to get out of order.

Another object of this invention is to provide an improved combined valve and pressure gauge in which a conventional pressure gauge of any approved construction may be employed and which is so constructed that when fluid such as compressed air is being supplied to the tire, the pressure supply to the pressure gauge will be cut off, so that the pressure gauge will only be operated when the fluid has ceased flowing to the tire, thus preventing the pressure gauge from being operated more than is necessary which might throw the pressure gauge out of adjustment.

A further object of this invention is to provide a device of the class referred to which is of neat and compact construction and which may be easily handled.

With the foregoing and other objects in view which will be made manifest in the following detailed description and specifically pointed out in the appended claims, reference is had to the accompanying drawings for an illustrative embodiment of the invention, wherein:

Figure 1 is a side elevation of the improved tire inflater,

Fig. 2 is a top plan view of the same, and

Fig. 3 is a vertical section taken on the line 3—3 of Fig. 2.

Referring to the accompanying drawings wherein similar reference characters designate similar parts throughout, the improved tire inflater consists of a body 10 having an inlet at one end provided by the member 11 to which is secured a coupling member 12 provided on a hose 13 leading from the source of supply of compressed air. A small nipple 14 is formed integral with the body and has a bore 15 establishing communication between the interior of the body and the interior of the nipple, thus forming an outlet from the body. To this nipple may be attached a hose 16 as by a coupling 17 and on the end of the hose 16 there may be provided the conventional tip adapted to be applied to the valve stem on the tire.

Between the inlet and the outlet a valve seat 18 is formed in the body 10, on which is adapted to seat a resilient member 19 mounted upon the valve 20. The valve 20 is cup-like in form to receive the resilient member 19 which may be a disc of resilient rubber. The valve has a stem 21 which loosely fits within the member 11 and a coil spring 22 is disposed about the stem and is compressed between the member 11 and the body of the valve 20. A tubular member 23 is also disposed within the body having one end disposed adjacent the resilient member 19 but slightly spaced therefrom. Within the body and around the tubular member 23 there is packing 24, which is compressed about the body by a packing nut 25. The packing 24 is preferably formed of two leather washers, one of which is quite thin and is cupped about the tubular member 23 to prevent leakage thereabout. On the tubular member there are two flanges 26 and 27 between which fits an arm 28 on an angular actuating lever 29. This lever is pivoted as by a pivot pin 30 upon ears 31 formed on the top of the body adjacent the aperture 32 through which the arm 28 extends. By pressing the free end of the actuating lever downwardly, the tubular member may be caused to move back and forth within the body against the action of the coil spring 33 disposed about the tubular member and bearing against the flange 26.

A pressure gauge indicated at 34 is fastened to the end of the tubular member 23 and this pressure gauge may be of any desired or approved construction. The casing of the pressure gauge is threadedly connected to the tubular member and a gasket 35 may be employed to prevent leakage at the connection. The complete pressure gauge being fastened to the tubular member 23 moves with it upon actuation of the actuating lever 29. It is protected from damage by means of a cylindrical guard 36 threaded into the end of the body 10.

The operation of the improved tire inflater is as follows: The air pressure is supplied through the hose 13 and urges the valve 20 against its seat 18. The coil spring 22 assists in maintaining the valve against its seat. When it is desired to allow air to pass into the tire, the free end of the actuating lever is pressed downwardly. This causes the tubular member 23 and the pressure gauge 34 to move toward the inlet. The end of the tubular member 23 soon engages the resilient member 19, thus closing the tubular member 23 and causing the valve 20 to be removed from its seat. When the valve is thus opened, the air may pass through the body and into the outlet, and as the tubular member 23 is closed, the pressure gauge 34 will not be actuated. On release of the actuating lever 29 the valve 20 returns to its seat and the spring 33 moves the tubular member and pressure gauge into such position that the tubular member no longer engages the resilient member 19. Consequently, in this position the pressure which may be in the hose 16 is conveyed through the bore 15 and through the interior of the tubular member to the pressure guage, causing the pressure gauge to be actuated, its indicating member 37 moving outwardly from the end of the guard 36 so as to be readily visible. In this manner it will be appreciated that the pressure gauge operates only when air has ceased flowing from the inlet to the outlet, so that the pressure guage will not be apt to get out of order or thrown out of adjustment.

From the above described construction it will be appreciated that an improved tire inflater is provided which is of a simple construction and which has few moving parts which are not apt to get out of order.

It will be understood that various changes may be made in the detail of construction without departing from the spirit or scope of the invention as disclosed in the appended claims.

I claim:

1. A device of the class described comprising a body, means providing an inlet to the body, means providing an outlet therefrom, means providing a second outlet therefrom, a valve seat in the body between the inlet and first named outlet, a valve adapted to seat thereon, an elongated tubular member for conveying fluid to said second named outlet, said tubular member having a portion smaller in diameter than the diameter of the exposed surface of the valve adapted to seat upon said valve, means for moving said tubular member to cause it to seat upon the valve and unseat the valve to permit fluid to pass through the body from the inlet to the first mentioned outlet, without permitting fluid to pass to said second outlet, a packing about said tubular member, said packing being formed of two leather washers, one of which is comparatively thin and is cupped about the tubular member, and spring means urging the tubular member into position disengaged from the valve whereby the valve may seat and fluid may pass through said second outlet.

2. A device of the class described comprising a body having an inlet and first and second outlets, a tubular member slidable in the body and adapted to convey fluid from the interior of the body to the second outlet, a valve closure within the body adapted to be seated upon a seat therein to prevent flow through the body from the inlet to either outlet, said tubular member being smaller in diameter where it engages the valve than the exposed surface of the valve and being adapted to be moved into engagement with the seating face of the valve closure so as to be closed thereby and serving to move the valve closure from its seat, permitting fluid to flow through the body from the inlet to the first outlet, and means for moving the tubular member into engagement with said valve closure.

3. A device of the class described comprising means providing a body having an inlet and first and second outlets, a tubular member having an open end slidable in the body for conveying fluid from the interior of the body to the second outlet, a valve closure in the body, spring means urging the valve closure into closed position against a seat in the body to prevent the flow of fluid from the inlet to either outlet, and means for moving the tubular member so as to have its open end engage the seating face of the valve closure, causing the tubular member to be closed by the valve closure and the valve closure to be removed from its seat thereby, the portion of the tubular member engageable on the valve closure, being smaller in diameter than the exposed surface on the valve closure when the valve is in closed position.

4. A device of the class described comprising a body having an inlet and first and second outlets, a tubular member disposed within the body for conveying fluid from the interior of the body to the second outlet, a valve closure within the body adapted to seat therein to prevent fluid flow through the body from the inlet to either outlet, said tubular member being adapted to engage the seating face of the valve closure permitting fluid to flow from the inlet to the first outlet without decreasing the size of the first outlet and causing the tubular member to be closed by the valve closure.

5. A device of the class described comprising a body having an inlet and first and second outlets, a tubular member slidable in the body and adapted to convey fluid from the interior of the body to the second outlet, a valve closure within the body adapted to be seated upon a seat therein to prevent flow through the body from the inlet to either outlet, said tubular member being adapted to be moved into engagement with the seating face of the valve closure so as to be closed thereby and serving to move the valve closure from its seat without decreasing the size of the first outlet, permitting fluid to flow through the body from the inlet to the first outlet.

6. A device of the class described comprising a body having an inlet and first and second outlets, a tubular member disposed within the body for conveying fluid from the interior of the body to the second outlet, a resiliently faced valve closure within the body adapted to seat therein to prevent fluid flow through the body from the inlet to either outlet, said tubular member being adapted to engage the resilient face of the valve closure to unseat the valve closure and close the tubular member, permitting fluid to flow from the inlet to the first outlet.

7. A device of the class described comprising a body having an inlet and first and second outlets, a tubular member disposed within the body for conveying fluid from the interior of the body to the second outlet, a flatly faced valve closure within the body adapted to seat therein to prevent fluid flow through the body from the inlet to either outlet, said tubular member being adapted to be caused to engage the flat face of the valve closure to unseat the valve closure and close the tubular member permitting fluid to flow from the inlet to the first outlet.

8. A device of the class described comprising a body having an inlet and first and second outlets, a packing nut in the second outlet, there being a shoulder adjacent the packing nut against which packing may be compressed by the packing nut, a tubular member slidable through the packing nut and packing for conveying fluid from the interior of the body to the second outlet, a valve closure within the body adapted to seat therein to prevent fluid flow through the body from the inlet to either outlet, said tubular member being adapted to engage the first of the valve closures to unseat it and close the tubular member permitting fluid to flow from the inlet to the first outlet.

9. A device of the class described comprising a body having an inlet and first and second outlets, a packing nut in the second outlet, there being a shoulder adjacent the packing nut against which packing may be compressed by the packing nut, a tubular member slidable through the packing nut and packing for conveying fluid from the interior of the body to the second outlet, a flat resiliently faced valve closure within the body adapted to seat therein to prevent fluid flow through the body from the inlet to either outlet, said tubular member being adapted to engage the resilient face of the valve closure to unseat it and close the tubular member permitting fluid to flow from the inlet to the first outlet.

10. A device of the class described comprising a body having an inlet and first and second outlets, a tubular member disposed within the body for conveying fluid from the interior of the body to the second outlet, a valve closure within the body adapted to seat on a seat therein to prevent fluid flow through the body from the inlet to either outlet, said tubular member being smaller than the interior of the valve seat and being capable of being projecting through the valve seat into engagement with the valve closure to unseat the valve closure, close the tubular member, and prevent flow from the inlet to the first outlet.

11. A device of the class described comprising a body having an inlet and first and second outlets, a tubular member disposed within the body for conveying fluid from the interior of the body to the second outlet, a valve seat within the body, a valve closure having a resilient face adapted to seat upon the valve seat to prevent fluid flow through the body from the inlet to either outlet, said tubular member being smaller than the interior of the valve seat and being adapted to be projected through the valve seat into engagement with the valve closure to unseat the valve closure, close the tubular member, and permit fluid to flow from the inlet to the first outlet.

In testimony whereof I have signed my name to this specification.

LOGAN C. BYARS.